United States Patent
Desai et al.

(10) Patent No.: US 10,310,085 B2
(45) Date of Patent: Jun. 4, 2019

(54) PHOTONIC INTEGRATED DISTANCE MEASURING PIXEL AND METHOD OF DISTANCE MEASUREMENT

(71) Applicant: Mezmeriz Inc., Ithaca, NY (US)

(72) Inventors: Shahyaan Desai, Ithaca, NY (US); Scott G. Adams, Ithaca, NY (US); Clifford A. Lardin, Ithaca, NY (US)

(73) Assignee: Mezmeriz Inc., Ithaca, NY (US)

( * ) Notice: Subject to any disclaimer, the term of this patent is extended or adjusted under 35 U.S.C. 154(b) by 9 days.

(21) Appl. No.: 15/643,744

(22) Filed: Jul. 7, 2017

(65) Prior Publication Data

US 2019/0011559 A1   Jan. 10, 2019

(51) Int. Cl.
*G01S 17/32* (2006.01)
*G01S 7/481* (2006.01)
(Continued)

(52) U.S. Cl.
CPC .............. *G01S 17/32* (2013.01); *G01S 7/4811* (2013.01); *G02B 6/12004* (2013.01);
(Continued)

(58) Field of Classification Search
CPC .......... G02B 2006/12107; G02B 2006/12128; G02B 2006/12102; G02B 2006/12104; G02B 2006/12121; G02B 2006/1238; G02B 2006/12159; G02B 6/12004; G02B 6/122; G02B 6/1228; G02B 6/131; G02B 6/42; G02B 6/0833; G02B 6/101; G02B 26/0833; G02B 26/101;
(Continued)

(56) References Cited

U.S. PATENT DOCUMENTS 4,830,486 A   5/1989  Goodwin
4,973,153 A * 11/1990  Yokokura ............... G01S 17/32
                                                    356/4.09
(Continued)

OTHER PUBLICATIONS

Author: Cong et al., Title: Demonstration of a 3-dB directional coupler with enhanced robustness to gap variations for silicon wire waveguides, Date: 2014, Publisher: Optical Society of America (Year: 2014).*
(Continued)

*Primary Examiner* — Taeho Jo
(74) *Attorney, Agent, or Firm* — Bond, Schoeneck & King, PLLC; Jeffrey Powers

(57) ABSTRACT

A distance-measuring pixel apparatus includes a photonic integrated circuit disposed on a common substrate that further includes a photonic integrated circuit substrate having disposed thereon two 3 dB directional couplers, a GRIN lens, and a partially reflecting Faraday mirror having a first side that is optomechanically coupled to a second side of the GRIN lens; and a source laser, a first photodetector, and a second photodetector. A related distance measuring method includes, using the distance-measuring pixel apparatus, generating a local oscillator (LO) beam, generating an echo, combining the LO beam and the echo beam, splitting the combined LO beam and the echo beam, and producing a modulation of the photodetector assembly photocurrent at a frequency that encodes the distance of a remote object.

18 Claims, 12 Drawing Sheets

(51) Int. Cl.
*G02B 26/08* (2006.01)
*G02B 26/10* (2006.01)
*G02B 6/12* (2006.01)

(52) U.S. Cl.
CPC ....... *G02B 26/0833* (2013.01); *G02B 26/101* (2013.01); *G02B 2006/12102* (2013.01); *G02B 2006/12104* (2013.01); *G02B 2006/12121* (2013.01); *G02B 2006/12138* (2013.01)

(58) Field of Classification Search
CPC ........... G02B 2006/12138; H01S 5/026; H01S 5/0262; G01S 17/32; G01S 7/4811
USPC ...................................................... 250/341.8
See application file for complete search history.

(56) References Cited

U.S. PATENT DOCUMENTS

| | | | |
|---|---|---|---|
| 5,134,276 A | 7/1992 | Hobbs | |
| 5,838,854 A * | 11/1998 | Taneya | G02B 6/12004 385/50 |
| 5,910,840 A * | 6/1999 | Furstenau | G01J 3/45 356/364 |
| 6,133,993 A * | 10/2000 | Labaar | G01P 3/36 356/28.5 |
| 6,215,295 B1 * | 4/2001 | Smith, III | G01R 1/06772 324/601 |
| 6,504,604 B1 * | 1/2003 | Holland | G01M 11/3181 356/73.1 |
| 7,139,446 B2 | 11/2006 | Slotwinski | |
| 7,361,883 B2 | 4/2008 | Xu et al. | |
| 7,515,275 B2 * | 4/2009 | Beaulieu | G01B 9/02044 356/456 |
| 8,620,164 B2 | 12/2013 | Heck et al. | |
| 8,687,173 B2 | 4/2014 | Rezk et al. | |
| 9,653,882 B1 * | 5/2017 | Zheng | H01S 5/142 |
| 9,759,993 B2 | 9/2017 | Desai | |
| 2003/0226955 A1 * | 12/2003 | Kim | B82Y 35/00 250/221 |
| 2005/0023434 A1 * | 2/2005 | Yacoubian | G01N 29/2418 250/200 |
| 2005/0168752 A1 * | 8/2005 | Bell, Jr. | G01D 5/35303 356/482 |
| 2005/0185191 A1 * | 8/2005 | Shpantzer | G01H 9/00 356/485 |
| 2005/0237811 A1 * | 10/2005 | Xu | G01J 9/00 365/185.22 |
| 2006/0171650 A1 * | 8/2006 | Mendoza | G02B 6/12009 385/132 |
| 2006/0182383 A1 | 8/2006 | Slotwinski | |
| 2007/0154137 A1 * | 7/2007 | Mino | G02F 1/31 385/16 |
| 2008/0018907 A1 * | 1/2008 | Beaulieu | G01B 9/02044 356/482 |
| 2008/0050013 A1 * | 2/2008 | Munro | G01S 13/89 382/154 |
| 2008/0058629 A1 * | 3/2008 | Seibel | A61B 1/0008 600/368 |
| 2009/0180099 A1 | 7/2009 | Kurokawa | |
| 2010/0085992 A1 * | 4/2010 | Rakuljic | G01D 5/266 372/20 |
| 2010/0225913 A1 * | 9/2010 | Trainer | G01N 15/0205 356/338 |
| 2011/0205523 A1 | 8/2011 | Rezk et al. | |
| 2011/0221627 A1 * | 9/2011 | Pierno | G01S 7/4052 342/54 |
| 2012/0026503 A1 * | 2/2012 | Lewandowski | G01N 21/4795 356/477 |
| 2012/0316830 A1 * | 12/2012 | Eyal | G01B 11/026 702/159 |
| 2013/0155413 A1 * | 6/2013 | Liesener | G01B 11/2441 356/479 |
| 2013/0209112 A1 * | 8/2013 | Witzens | G02B 6/2813 398/214 |
| 2014/0049770 A1 * | 2/2014 | Li | A61B 5/0095 356/40 |
| 2014/0152986 A1 * | 6/2014 | Trainer | G01N 15/0205 356/336 |
| 2014/0152997 A1 * | 6/2014 | Goldberg | G01N 21/4795 356/479 |
| 2014/0293265 A1 * | 10/2014 | Stettner | G01S 17/06 356/4.01 |
| 2014/0376001 A1 * | 12/2014 | Swanson | A61B 5/0066 356/479 |
| 2015/0117813 A1 * | 4/2015 | Bai | G02B 6/1228 385/24 |
| 2015/0124261 A1 * | 5/2015 | Jaillon | G01B 9/02091 356/479 |
| 2016/0202164 A1 * | 7/2016 | Trainer | G01N 15/0211 356/336 |
| 2017/0052015 A1 * | 2/2017 | Swanson | G01B 9/02091 |
| 2017/0074640 A1 * | 3/2017 | Cable | G01B 9/02083 |
| 2017/0199098 A1 * | 7/2017 | Bovington | G01M 11/005 |
| 2017/0268987 A1 * | 9/2017 | Swanson | A61B 5/0066 |
| 2017/0268988 A1 * | 9/2017 | Swanson | A61B 5/0066 |
| 2017/0293083 A1 * | 10/2017 | Menard | G02F 1/218 |
| 2017/0299500 A1 * | 10/2017 | Swanson | A61B 5/0066 |
| 2017/0299697 A1 * | 10/2017 | Swanson | A61B 5/0066 |
| 2017/0371227 A1 * | 12/2017 | Skirlo | G02F 1/2955 |
| 2018/0017464 A1 * | 1/2018 | Na | H04B 10/071 |
| 2018/0045820 A1 * | 2/2018 | Fericean | G01S 7/03 |
| 2018/0066931 A1 * | 3/2018 | Swanson | G01B 9/02091 |
| 2018/0088002 A1 * | 3/2018 | Ibrahim | G01D 5/35316 |
| 2018/0210068 A1 * | 7/2018 | Efimov | G01S 17/58 |

OTHER PUBLICATIONS

International Search Report and Written Opinion for PCT Application No. PCT/US2018/040981 dated Sep. 13, 2018; Forms PCT/ISA/220, PCT/ISA/210, and PCT/ISA/237; 6 pages.

* cited by examiner

PHOTONIC INTEGRATED DISTANCE MEASURING PIXEL AND METHOD OF DISTANCE MEASUREMENT

RELATED APPLICATION DATA

N/A.

GOVERNMENT FUNDING

N/A.

BACKGROUND

Aspects and embodiments of the invention most generally pertain to distance measuring sensors; more particularly to a chip-scale, distance measuring photonic integrated circuit; and, most particularly to a distance measuring pixel and associated coherent detection method for determining a measured distance from the distance measuring pixel to a remote object.

Miniaturized imaging systems capable of high precision 3D range measurements are of great interest as sensors in applications such as industrial inspection, construction and architecture, Virtual Reality, and autonomous vehicles. Most systems today are based on the measurement of the time of flight (ToF) of light, phase shift of a time varying light signal, or optical triangulation: either by measuring the distortion of a projected laser pattern on a surface to determine its 3D shape, or using two cameras to simulate stereo vision.

ToF systems measure the delay between an emitted pulse of light and its reflection from a distant object point to infer its distance. Since the speed of light is a known constant the calculation of distance is trivial based on the time between emitted and received pulses. However, the major drawbacks of such a system are the need for very high speed precision measurement circuits and large laser emission power required.

In the phase-shift method, the transmitted light intensity is modulated sinusoidally, and the phase shift of the reflected light signal from round-trip time is used to determine distance. Drawbacks of the phase shift method include range dependence on modulation frequency, susceptibility to crosstalk and noise, and a need to collect many samples to average the error between measurements and recover an accurate distance.

Both ToF and phase-shift systems need to sweep the spot from one or multiple lasers over a surface to adequately estimate its 3D shape. Current laser scanning range finding systems are expensive due to the need for precision opto-mechanical assembly, and high resolution motors capable of accurately rotating the laser measurement system and 3D mapping a surface or environment. These systems however, provide the highest resolution of distance measurement and 3D mapping capability over long distance ranges, indoors and outdoors.

Sensors that employ light patterns are usually smaller and inexpensive. Since they rely on the analysis of distortions in the emitted light patterns to map the shape of a surface they are generally lower in power, do not require the use of high speed precision measurement circuits, and may not need to be mechanically swept over the surface of interest. The major limitations of these sensors are poor range, resolution, and inability to operate in outdoor and bright ambient environments. Both types of devices also suffer from generally slow response.

A more recent invention is a Photonic Mixing Device (PMD) (U.S. Pat. No. 7,361,883), which is a variant of a radio frequency modulated (RFCW) continuous wave LIDAR. In this sensor the complex electrical mixing circuitry commonly used in RFCW LIDAR is replaced with all optical mixing that occurs within the pixel of a photosensitive semiconductor device. A modulated light source is used to illuminate a surface. The photosensitive semiconductor surface is electrically modulated at the same frequency as the illumination source and 3D distance is determined by the electro-optical mixing of the two signals.

Although miniature and inexpensive, the drawback of the PMD device is the need for large pixel sizes to capture adequate reflected light resulting in poor lateral resolution of a depth image. The limited frequency at which the photosensitive semiconductor pixels in the system can be modulated during optical mixing also limits the device's depth measurement resolution. Furthermore, the system is susceptible to saturation from ambient light, which introduces errors in distance measurement.

Coherent methods for laser ranging, such as frequency modulated continuous wave (FMCW) ranging, which uses optical homodyne detection can provide improvements in range, distance measurement accuracy, and operation in ambient lighting conditions over all of the other light ranging methods described. In such a system, the frequency of emission of the light is linearly modulated and the beam is split into two, wherein one beam is directed towards a measurement target, while the other forms a local oscillator (LO). Light returning from the target is mixed with the LO beam on the surface of a photodetector to provide optical interference patterns which may be processed to provide detailed range information about the target. On a square-law point detector such as a p-i-n photodiode, these interference fringes are manifest as a unique beat frequency, at which the detector's photocurrent is modulated, that is proportional to the modulation frequency of the light as well as the distance to the target. Such systems are described in U.S. Pat. No. 7,139,446B2 and U.S. Pat. No. 8,687,173B2.

FMCW systems are capable of providing precise distance measurements using low laser power levels. These systems may be coupled to rotating mirrors to scan the light over surfaces and produce range maps of environments. However, such systems are usually relatively expensive due to the complexity of the optical architecture and precise optical tolerances required in embodiments using free-space optics. Embodiments of such systems may also be implemented using fiber optic components, however these tend to be bulky and only slightly less complicated than free-space designs to manufacture.

What is needed therefore, is a distance measuring sensor that does not trade off measurement resolution and cost, is not susceptible to environmental artifacts, retains a compact size, and can be manufactured inexpensively. The following disclosure describes an FMCW distance measurement sensor that meets these requirements.

SUMMARY

The present disclosure is directed to a photonic integrated distance measuring pixel and method of distance Measurement.

According to an aspect is a distance-measuring pixel apparatus, comprising (a) a photonic integrated circuit disposed on a common substrate, comprising (i) a photonic integrated circuit substrate having disposed thereon, (ii) a first 3 dB directional coupler having first and second output ports and first and second input ports; (iii) a second 3 dB directional coupler having first and second output ports and first and second input ports, wherein the second input port of the first 3 dB directional coupler is directly optically coupled to the first input port of the second 3 dB directional coupler; (b) a GRIN lens having a first side that is optomechanically coupled to the first output port of the first 3 dB directional coupler; (c) a partially reflecting Faraday mirror having a first side that is optomechanically coupled to a second side of the GRIN lens; (d) a source laser having an output that is optically coupled to the first input port of the first 3 dB directional coupler; (e) a first photodetector optomechanically coupled to the first output port of the second 3 dB directional coupler; and (f) a second photodetector optomechanically coupled to the second output port of the second 3 dB directional coupler.

According to an embodiment, the second output port of the first directional coupler and the second input port of the second directional coupler in the pixel apparatus are optically terminated.

According to another embodiment, the source laser is a laser diode.

According to another embodiment, the source laser output is linearly polarized.

According to another embodiment, the source laser output is in the near infrared, mid infrared, or long wave infrared spectral regions.

According to another embodiment, the source laser output is linearly chirped.

According to another embodiment, the source laser is a distributed feedback (DFB) or distributed Bragg Reflector (DBR) laser with linewidths of ≤1 MHz.

According to another embodiment, the source laser output is in a frequency modulated continuous wave format.

According to another embodiment, the GRIN lens is in the form of a rod.

According to another embodiment, the first and second photodetectors are electrically configured to perform auto-balanced, differential signal detection.

According to another embodiment, the partially reflecting Faraday mirror reflects between 0.1%, to 50% of the light emitted from the first output port of the first 3 dB directional coupler.

According to another embodiment, the pixel apparatus further comprises an optical isolator disposed between the source laser and the photonic integrated circuit.

According to another embodiment, the source laser and the photonic integrated circuit are disposed on a common substrate.

According to another embodiment, the photodetectors are integrally fabricated within the photonic integrated circuit.

According to another embodiment, the pixel apparatus further comprises a light focusing component disposed optically downstream of the partial Faraday mirror.

According to another aspect, a method of measuring distance between a distance measuring pixel and a remote object, comprises (a) providing a distance measuring pixel apparatus as set forth in claim 1;
producing a frequency modulated light beam from the source laser; (b) coupling the frequency modulated light beam from the source laser into the first input port of the first 3 dB bidirectional coupler such that half the light is extinguished at the second output port of the first 3 dB bidirectional coupler, while the remainder is output at the first output port of the first 3 dB bidirectional coupler; (c) collecting a predetermined fraction of the light reflected from the partial Faraday mirror back into the GRIN lens and into the first output port of the first directional coupler to form a local oscillator (LO) light beam; (d) transmitting the remaining frequency modulated light beam through the partial Faraday mirror and towards a focusing optical component, which gradually focuses the light; (e) collecting light reflected from the remote object intersecting the gradually focused light using the focusing optical component, through the partial Faraday mirror, into the GRIN lens and subsequently into the first output port of the first bidirectional coupler, to form an echo light beam; (f) directing the combined LO and echo light beams towards the first input port of the second 3 dB bidirectional coupler where it is split equally at the two output ports of the second directional coupler; and (g) delivering the combined LO and echo beams at each output port of the second directional coupler onto the surface of a photodetector, wherein the optical mixing of the LO and echo signals produces a modulation of the photocurrent of each photodetector at a frequency that encodes the distance of the echo.

These and other aspects of the invention will be apparent from the embodiments described below.

DETAILED DESCRIPTION OF NON-LIMITING, EXEMPLARY EMBODIMENTS

In the following description, numerous specific details are set forth to clearly describe various specific embodiments disclosed herein. One skilled in the art will understand that the presently claimed invention may be practiced without all of the specific details discussed below.

Figure 1:
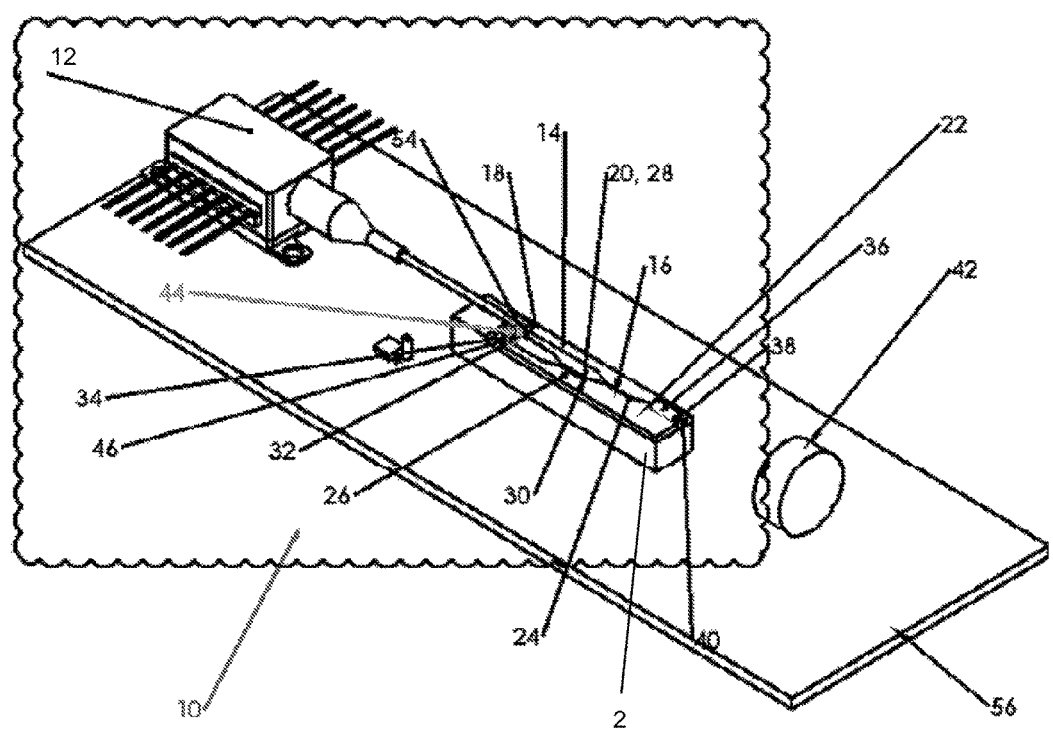
FIG. 1 schematically shows a distance measuring pixel in accordance with an embodiment of the invention.
Figure 2:
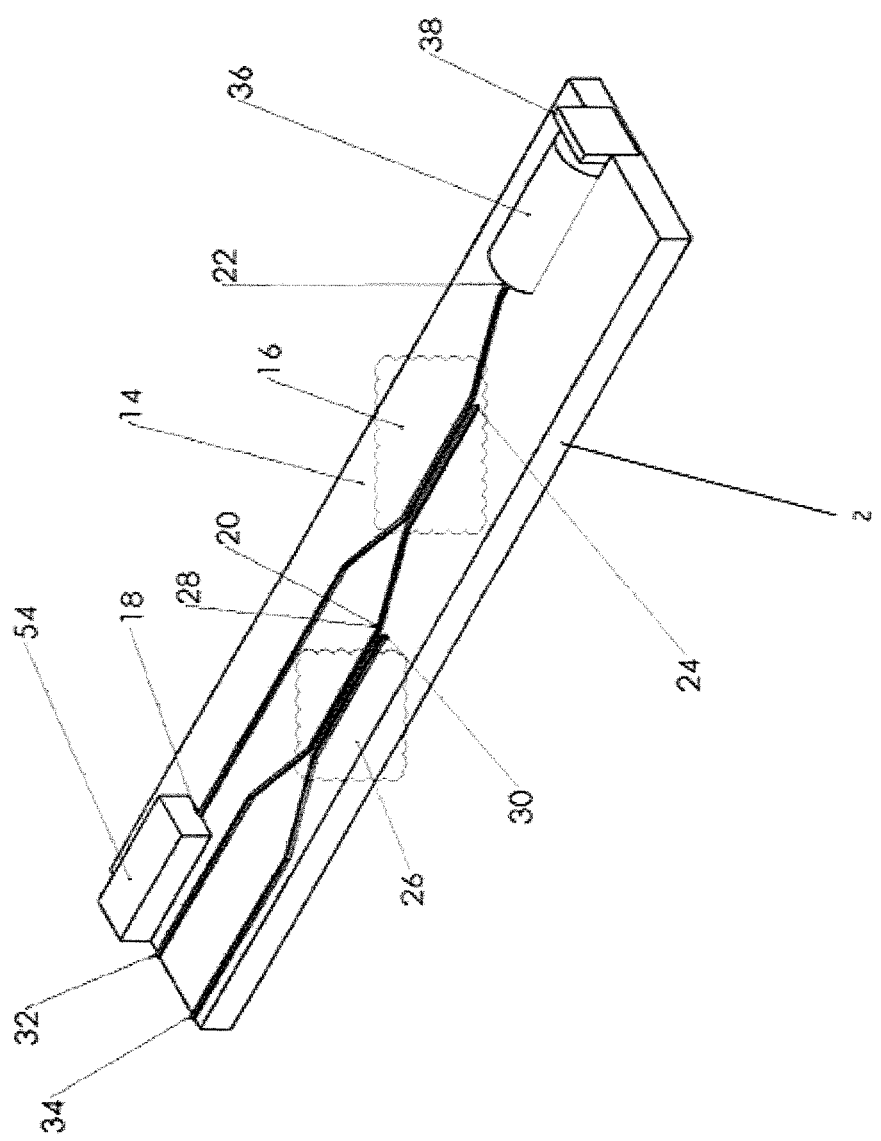
FIG. 2 schematically shows a photonic integrated circuit section forming a distance measuring pixel, in accordance with an embodiment of the invention.

FIGS. 1 and 2 show a distance measuring pixel 10. The laser which may not be on same substrate as the photonic circuit as is shown in FIG. 1 is a single frequency laser diode 12, which may emit linearly polarized radiation in the near infrared, mid infrared, or long wave infrared spectral regions, and made to chirp; i.e., be tuned to emit radiation at a rage of frequencies centered around a center frequency by modulating the laser's injection current, temperature, bias current of the gain medium, cavity length or a combination of all four. The modulation waveform is controlled to ensure that the emission frequency of the laser is modulated linearly over a time period. The laser 12 is optomechanically coupled to a photonic integrated circuit 14 (shown in greater detail in FIG. 2) comprising waveguides that can propagate the emitted laser radiation, and configured to form a first 3 dB directional coupler 16 with a first input port 18, a second input port 20, a first output port 22, a second output port 24; a second 3 dB directional coupler 26 with a first input port 28, a second input port 30, a first output port 32, a second output port 34. Light from the laser 12 is routed into the first input port 18 of the first directional coupler 16 such that an equal fraction of the light is routed towards the second output port 24 where it is extinguished by the appropriate termination of the second input port 24, while the other half of the light is routed into the first output port 22 where it is emitted.

A gradient index (GRIN) rod lens 36 to effectively couple light between the waveguide and free-space is optomechanically coupled to the first output port 22 of the first directional coupler 16, which routes the emitted laser light towards a partial Faraday mirror 38 that is optomechanically coupled to the gradient index rod lens 36. The partial Faraday mirror is formed by coating a magneto-optical material on the surface facing away from the gradient index rod lens with a material 40 that reflects a predetermined fraction of the laser radiation back towards the gradient index rod lens, while the rest of the laser radiation is transmitted towards focusing optics 42 that relay the light towards a remote object. The fraction of light reflected may be between 0.1%, up to 50% of the laser radiation emitted at port 22. The reflected light from the partial Faraday mirror 38 becomes a local oscillator (LO) signal.

The light reflected from the remote object is collected back into the focusing optics 42, through the partial Faraday mirror 38 and gradient index rod lens 36 and routed into the first output port 22 of the first directional coupler 16 as an echo signal. The first output port 22 of the first directional coupler 16 simultaneously contains the LO and echo light beams. Half the combined LO and echo signal is routed back towards the first input port 18 where it may be extinguished by an optical isolator 54 placed between the laser 12 and the input port 18 of the first directional coupler. The other half of the combined LO and echo signal is routed towards the second input port 20 of the first directional coupler, which corresponds with the first input port 28 of the second directional coupler 26. An equal fraction of the combined LO and echo light signal in the second directional coupler 26 is routed to the first and second output ports 32 and 34. By virtue of the evanescent wave coupling between the light signals in the two output ports 32 and 34, each carries one quarter the original combined LO and echo signal that are optically phase shifted by 90° relative to each other. Photodetectors 44 and 46, with a spectral response at the emission wavelength of laser 12, are connected to output ports 32 and 34 such that the optical mixing of the combined LO and echo light signal on the photodetector surface produces a modulation of the photocurrent of each detector 44 and 46 at a frequency that encodes the distance of the echo light signal's origin relative to the distance measuring pixel. This method of distance measurement is detailed in FIGS. 5 and 6.

FIG. 2 shows the photonic integrated circuit in greater detail. The GRIN rod lens 36 and partial Faraday mirror 38 may be integrated within the photonic circuit using silicon optical bench technology. Using semiconductor fabrication methods, very precise grooves and alignment holes may be formed on the photonic integrated circuit substrate 2 into which the free space optical components such as the gradient index rod lens 36, partial Faraday mirror 38 can be placed. The photonic circuit substrate may also integrate an optical isolator 54. The waveguides for the 3 dB couplers may be formed on a substrate such as silicon or glass using appropriate material layers transparent to the laser radiation. For example, $Si_3N_4$, and $SiO_2$ can be used as the core and cladding materials in the near-infrared through long-wave infrared spectrum, while Si and $SiO_2$ can be used for core/cladding layers in the near-to-mid infrared spectrum.

Figure 3A:
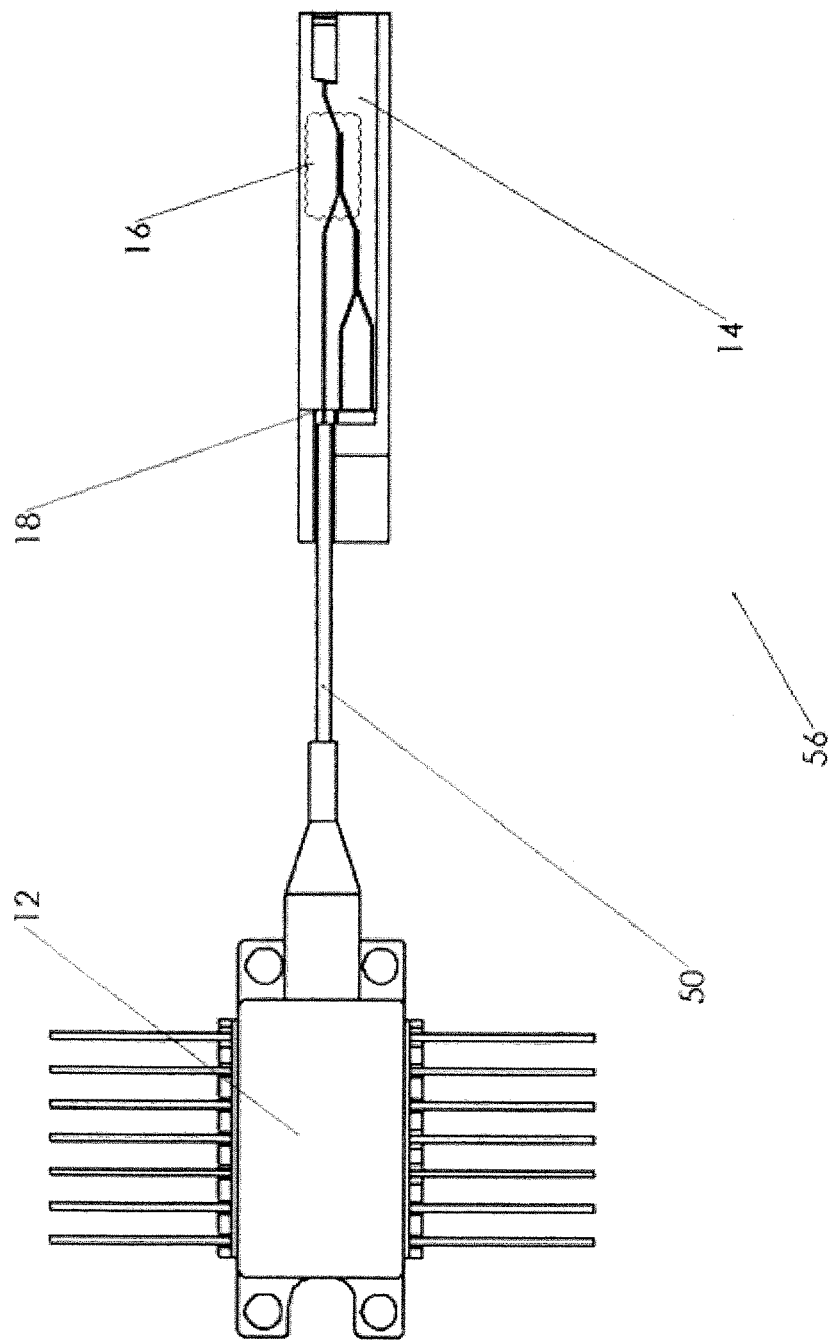
FIGS. 3A-3C schematically show three approaches for optomechanical coupling between a laser and the photonic integrated circuit, according to illustrative embodiments of the invention.
Figure 3B:
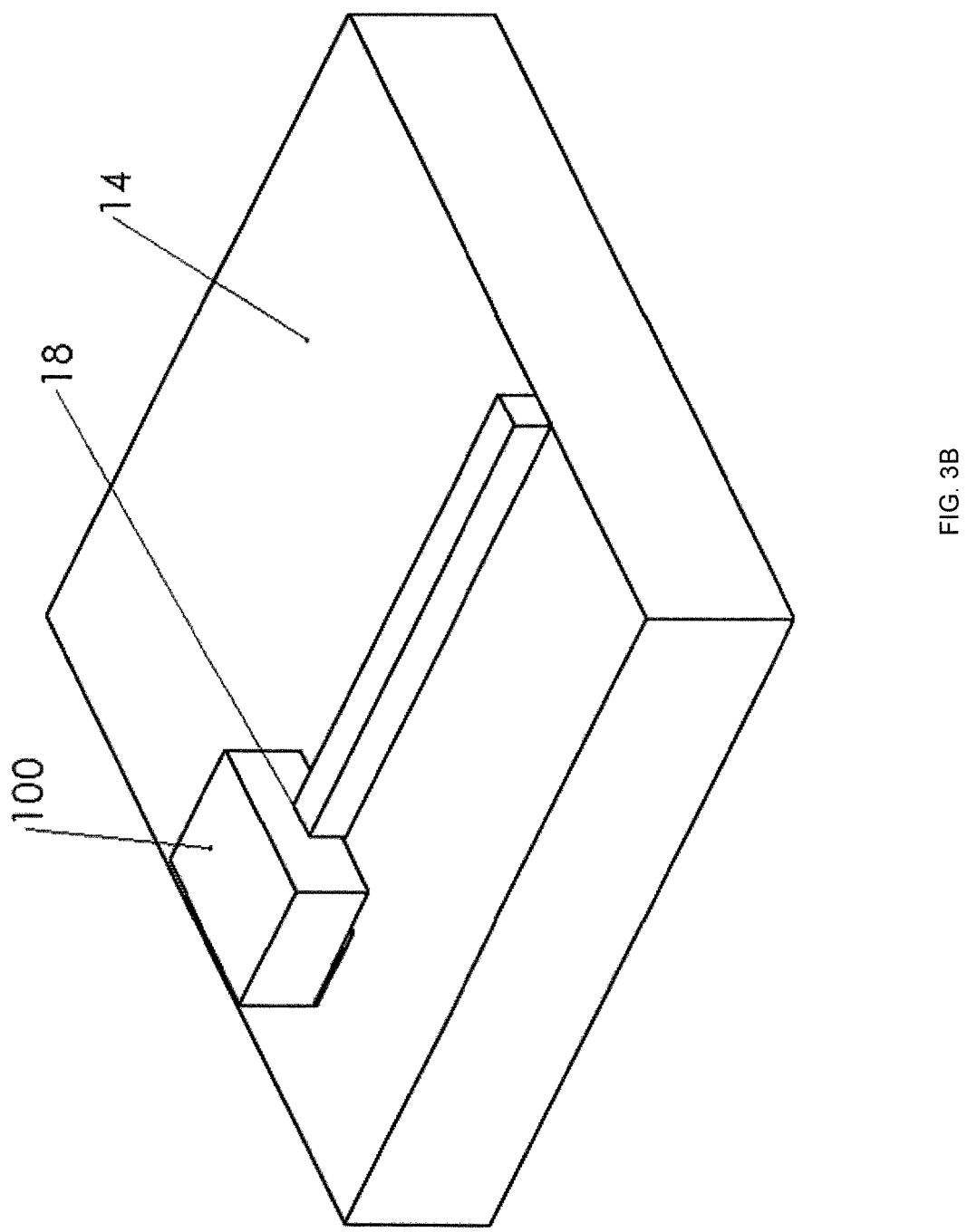
Figure 3C:
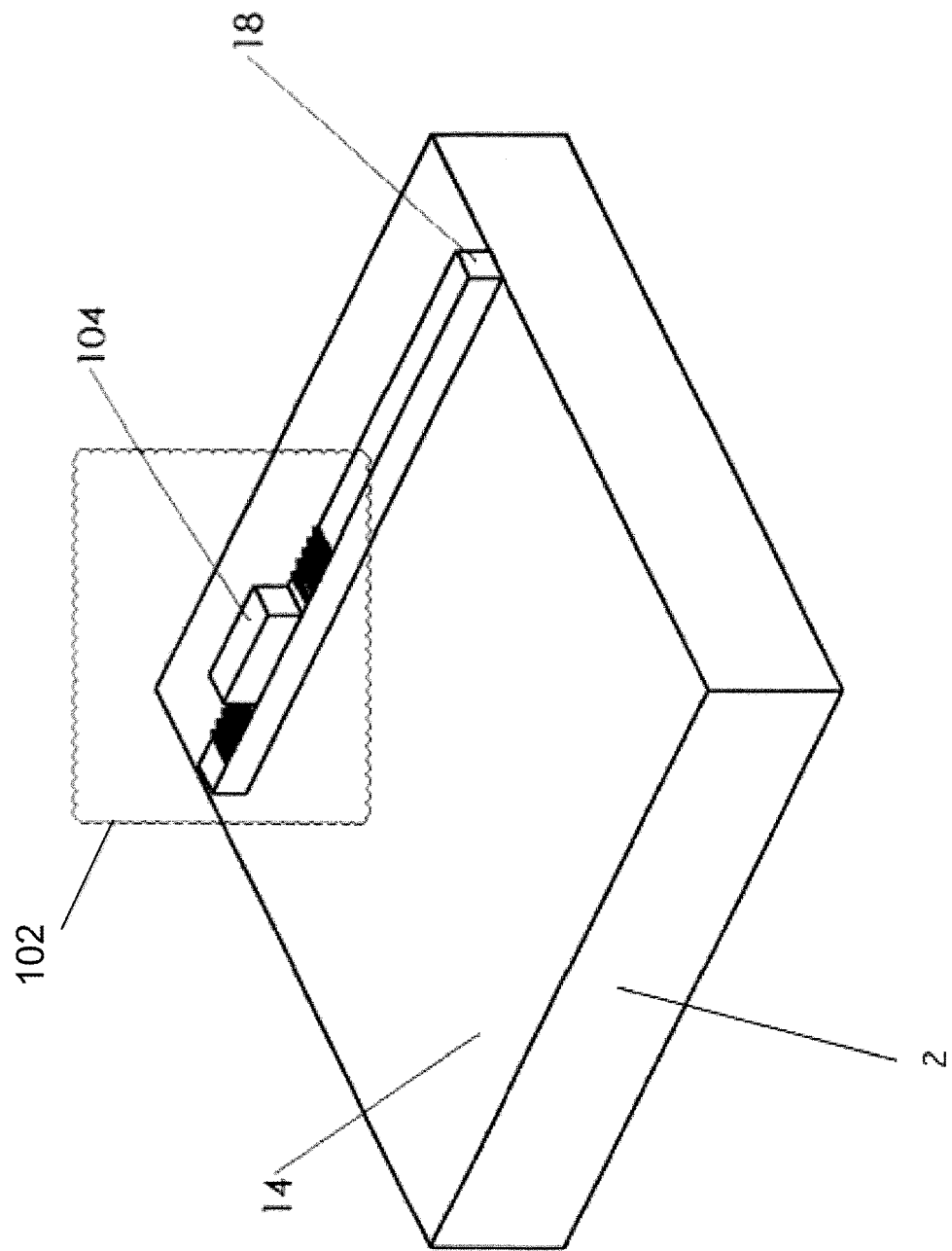

FIGS. 3A-3C show various methods that may be used to optomechanically couple the laser 12 to the photonic integrated circuit 14. Laser 12 may advantageously be a distributed feedback (DFB) or distributed Bragg Reflector (DBR) laser with linewidths of ≤1 MHz in a package separate to the photonic circuit 14 and coupled to the first input port 18 of directional coupler 16 using a polarization maintaining fiber pigtail 50 with the polished fiber face butt-coupled to the input port 18 as shown in FIG. 3A. Laser 12 may contain an integrated optical isolator, and the laser package as well as the photonic circuit may be co-located on a planar rigid substrate 56.

Alternatively, a laser die 100 may be prefabricated on its own respective substrate material and bonded to the photonic circuit substrate as shown in FIG. 3B, and may be optically coupled to the input waveguide port 18 using either butt-coupling or evanescent coupling, which are well developed in the art. The laser 102 may also be formed directly in the photonic circuit by bonding the laser gain medium such as a III-V semiconductor material 104 to the photonic circuit substrate 2 into which the laser cavity has been formed as described in U.S. Pat. No. 8,620,164 as shown in FIG. 3C.

Figure 4A:
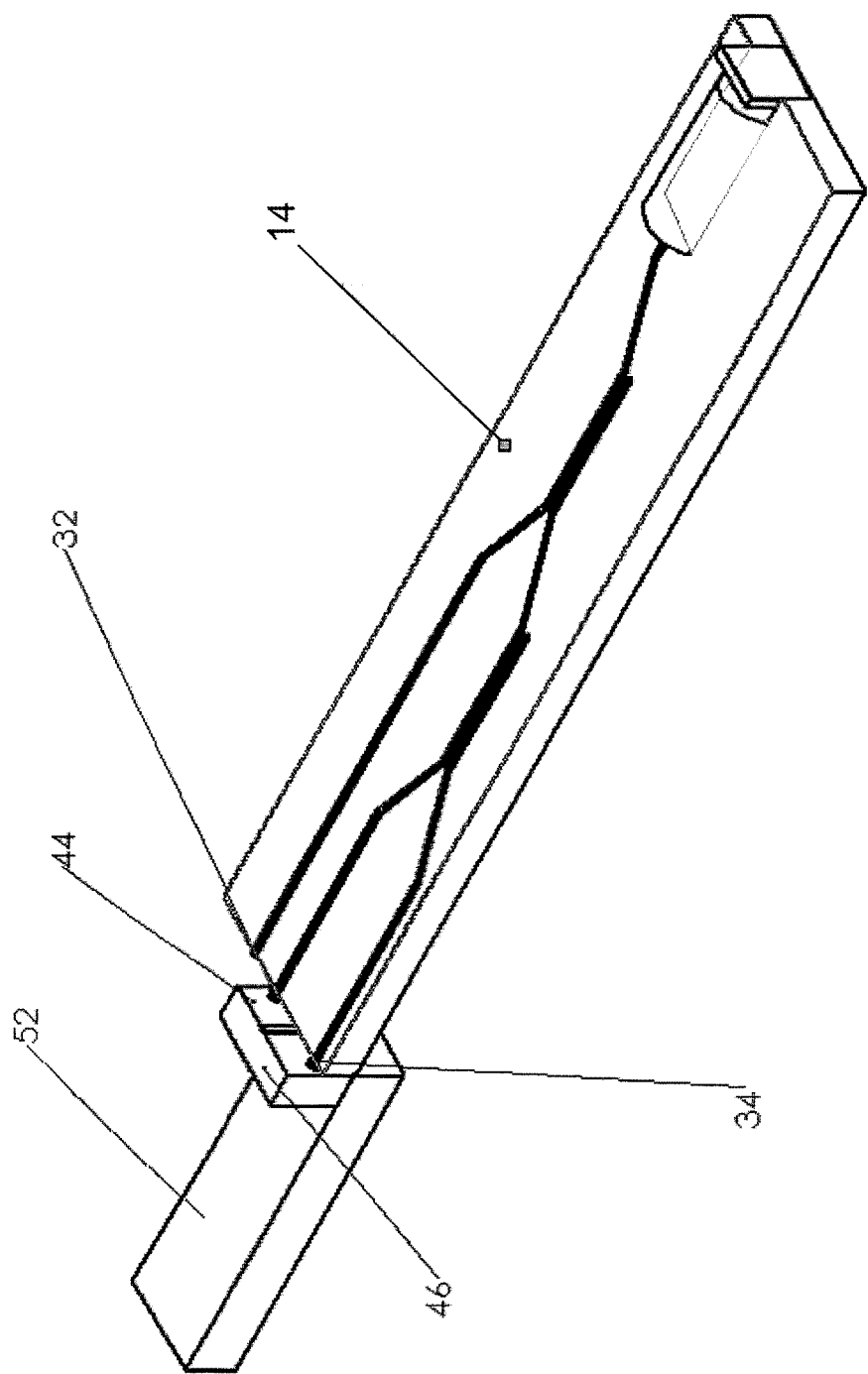
FIGS. 4A-4B schematically show different approaches for optomechanical coupling between photodetectors and the photonic integrated circuit, according to illustrative embodiments of the invention.
Figure 4B:
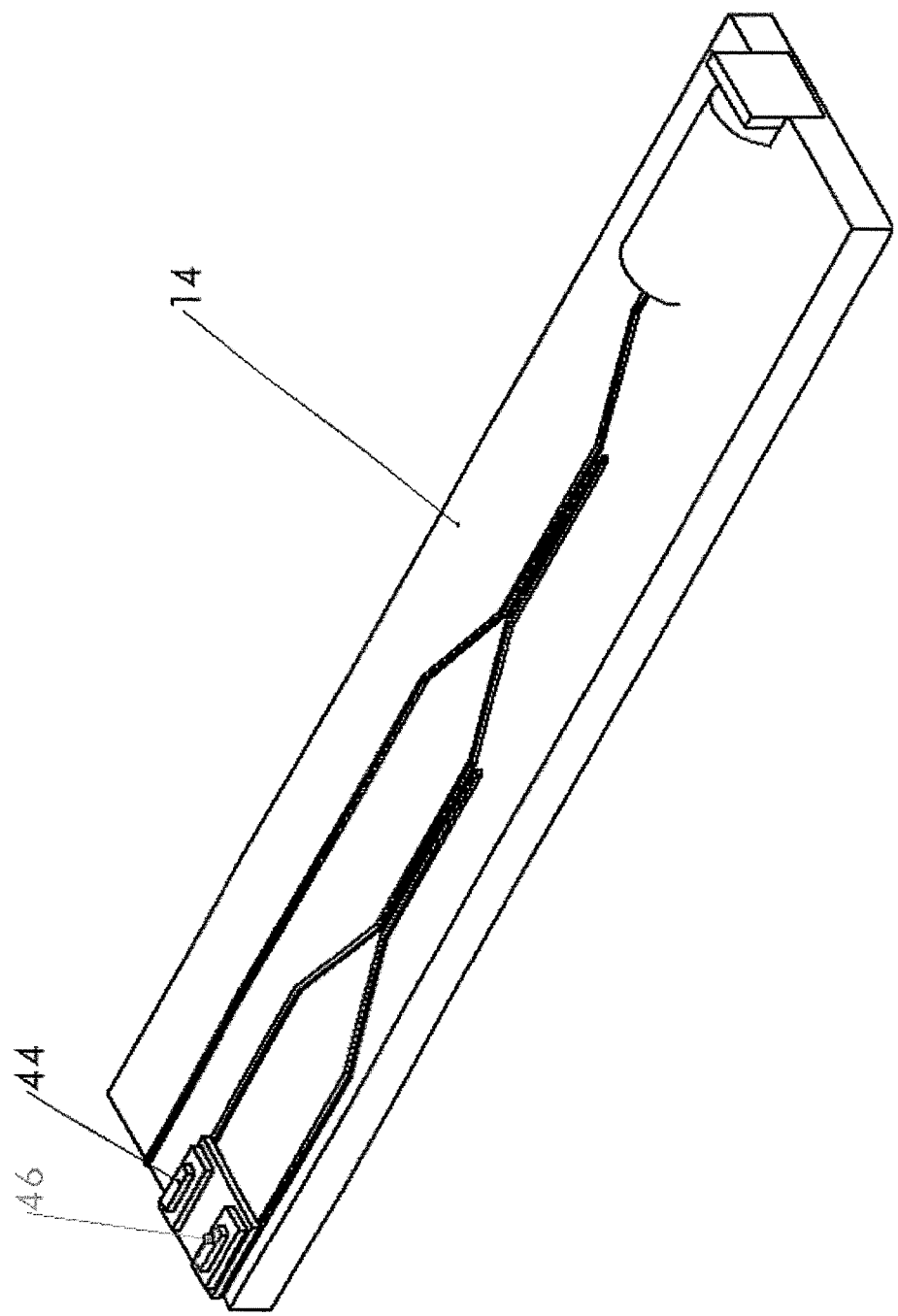

Similarly, FIG. 4A and FIG. 4B show the various optomechanical coupling methods between the photodetectors 44 and 46 and the photonic circuit 14. The photodetectors may be packaged in an assembly along with signal amplification circuits on a rigid printed circuit board 52. Photonic circuit 14 may be aligned so that the output ports 32 and 34 are aligned and butt-coupled to the photodetector surface, and bonded to the printed circuit board 52. Fiber pigtails may also be employed as the optical coupling between the output ports 32 and 34.

Alternatively, the photodetectors may be formed directly as part of the photonic circuit, either by appropriately doping the substrate material with impurity materials, or via the deposition of epitaxial films of photosensitive material with a spectral response to the laser radiation. These materials may include Si, InGaAs, and Ge. Photodetectors 44 and 46 may be electrically connected in a balanced configuration such that their photocurrents cancel. In this case, it is necessary to equalize the DC optical power impinging upon each photodiode. When this is done, the effective output of the balanced pair of photodiodes is zero until there is some difference in the intensity of one of the beams. When this occurs, it causes the pair to become "unbalanced" and a net signal appears on the output. To avoid the often tedious, manual task of balancing the intensities of the two beams, an auto-balancing circuit can be employed).

Figure 5:
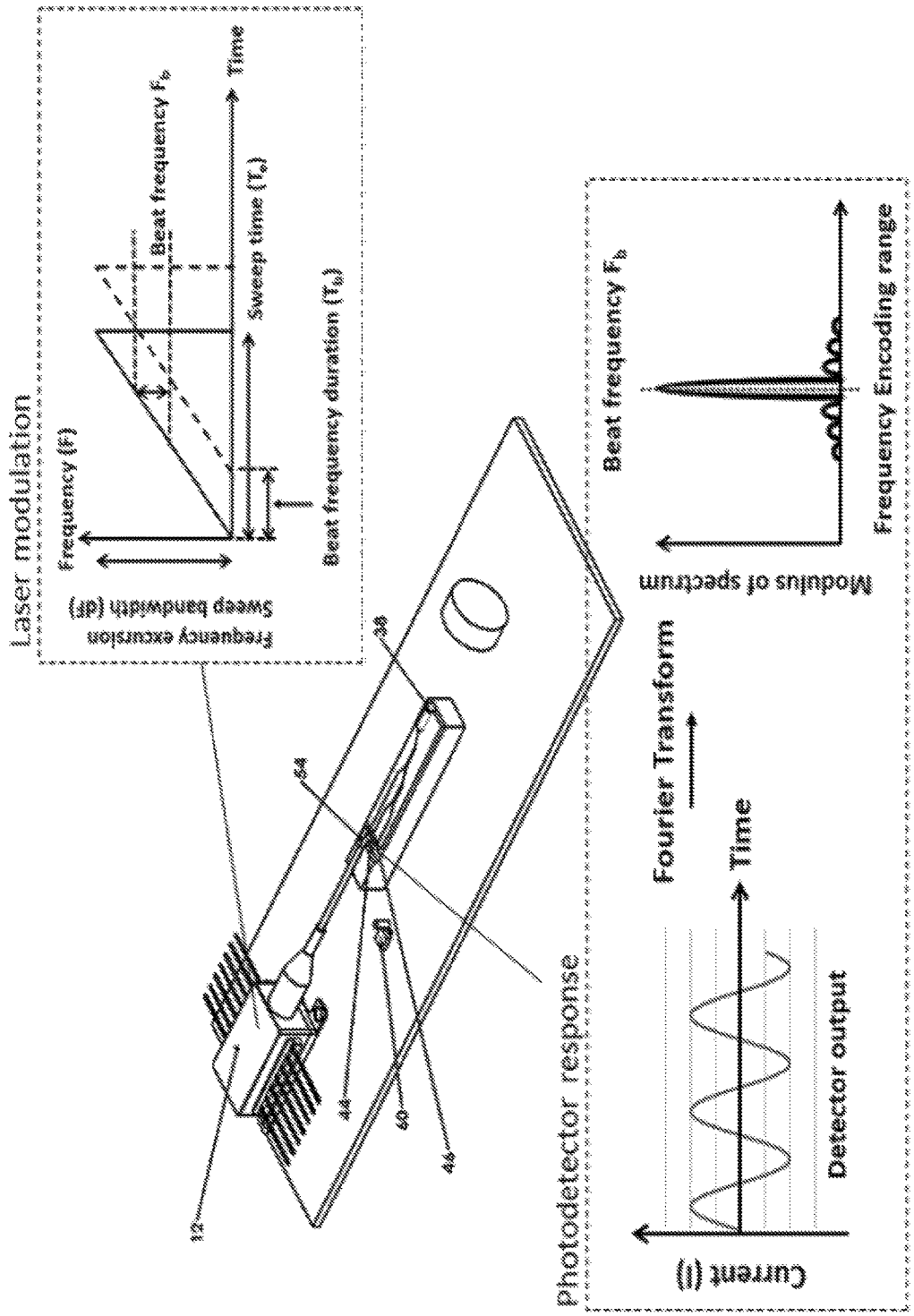
FIG. 5 schematically illustrates a frequency modulated continuous wave (FMCW) method of detecting distance and the relationship between detected distance and distance resolution, according to illustrative embodiments of the invention.

FIG. 5 provides further details on the distance measuring method employed within the distance measuring pixel. The laser 12 is modulated in a frequency modulated continuous wave format (FMCW) wherein the instantaneous frequency of optical radiation is periodically shifted by dF. The periodic and linear frequency chirp may practically be performed by applying a saw-tooth modulation to the injection current, junction temperature, bias current of the gain region, or any combinations of these methods. The laser output passes an optical isolator 54 to avoid deterioration from reflections back into the laser cavity. Combining or optically mixing the reflected chirped echo light from a remote object and the chirped LO light reflected from the partial Faraday mirror 38 onto the surface of photodetectors 44 and 46 produces a modulation of the photocurrent of each detector at a 'beat' frequency that is the difference of the frequency chirp pulse reflected from the Faraday mirror; i.e., the LO signal and the echo signal reflected from the object. The frequency of the beat tone generated from the optical mixing process on the photodetector is proportional to the target distance, the frequency chirp, and chirp time as described by the range resolution (dR) equation of an FMCW system:

$$dR=c/2dF,$$

where c is the speed of light in air and dF is the frequency chirp within the laser pulse. The beat frequency tone produced is a function of the linear frequency modulated chirp dF of the laser, the chirp pulse duration Tp, and range D:

$$Fb=(dF/Tp)*(2D/c),$$

where Fb is the beat frequency, and c is the speed of light in air.

Following the optical mixing of the LO and echo light signals on the photodetectors 44 and 46, a post detection processing may be performed by electronic circuitry 60, which may include time averaging, band pass filtering (BPF), FMCW demodulation, amplification, analog to digital conversion, and fast Fourier Transform (FFT) processing to decode the distance encoded within the beat frequency. All or part of the set of these components may be incorporated into the photonic circuit, or as a subsystem co-located with the photonic circuit on a separate rigid substrate along with the photonic circuit such as a printed circuit board.

Figure 6:
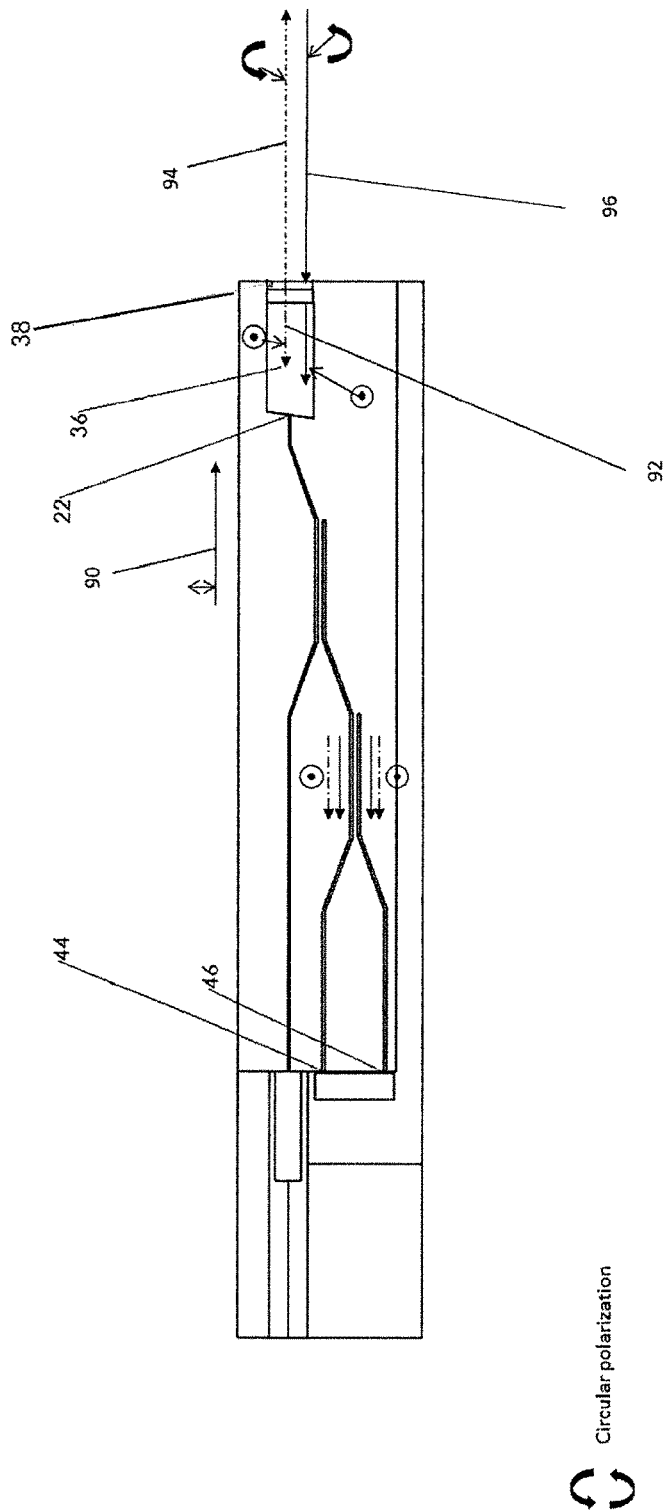
FIG. 6 schematically shows the light path from the distance measuring pixel to the remote object and back, highlighting a noise reduction feature, in accordance with an embodiment of the invention.

FIG. 6 highlights the method by which the present invention reduces the effect of the spurious signals from the environment, and back reflections from optical interfaces within the photonic circuit. Linearly polarized light 90 output at the first output port 22 of the first 3 dB coupler 16 passes through the gradient index rod lens 36 and is routed towards the partial Faraday mirror 38. Passing through the magneto-optical material, the linearly polarized light undergoes a 45° clockwise polarization rotation and becomes right circularly polarized before a predetermined fraction is reflected to form the LO signal. The reflected light 92 makes a second pass through the magneto-optical material and undergoes another 45° clockwise polarization and emerges from the partial Faraday mirror with a polarization orthogonal to the original linear polarization, and is routed back into the first input port 22 of the first 3 dB coupler via the gradient index rod lens 36. In a similar manner, the fraction of light 94 transmitted through the partial Faraday mirror 38 emerges from the distance measuring pixel towards an object with right circular polarization. Upon reflection from the object, provided the object is not birefringent, the reflected echo light 94 retains its right circular polarization and is collected back towards partial Faraday mirror 38. The fraction of echo light transmitted through partial Faraday mirror also makes a second pass though the magneto-optical material and acquires another 45° clockwise polarization rotation, to match the polarization state of the LO signal. Both LO and echo signals with the same polarization states are now routed back into the photonic circuit as described previously and mixed on the surface of each of the two photodetectors 44 and 46 to produce a beat frequency that encodes the distance of the echo signal. It is well understood in the field that mixing of light signals with the same polarization occurs with greater efficiency than signals with orthogonal polarization states. Back reflections from the optical interfaces within the photonic circuit such as for example a Fresnel reflection that may occur between the first output port 22 of first directional coupler 16 and the gradient index rod lens do not make a double pass through partial Faraday mirror and so do not have their polarization state rotated. Consequently their mixing efficiency with the orthogonally polarized LO light signal is greatly reduced, and hence any spurious beat frequencies generated are minimized. The embodied invention ensures that the LO and echo light signals have the same polarization state, further ensuring that the desired beat frequency measured at the photodetectors will have the largest amplitude.

Figure 7A:
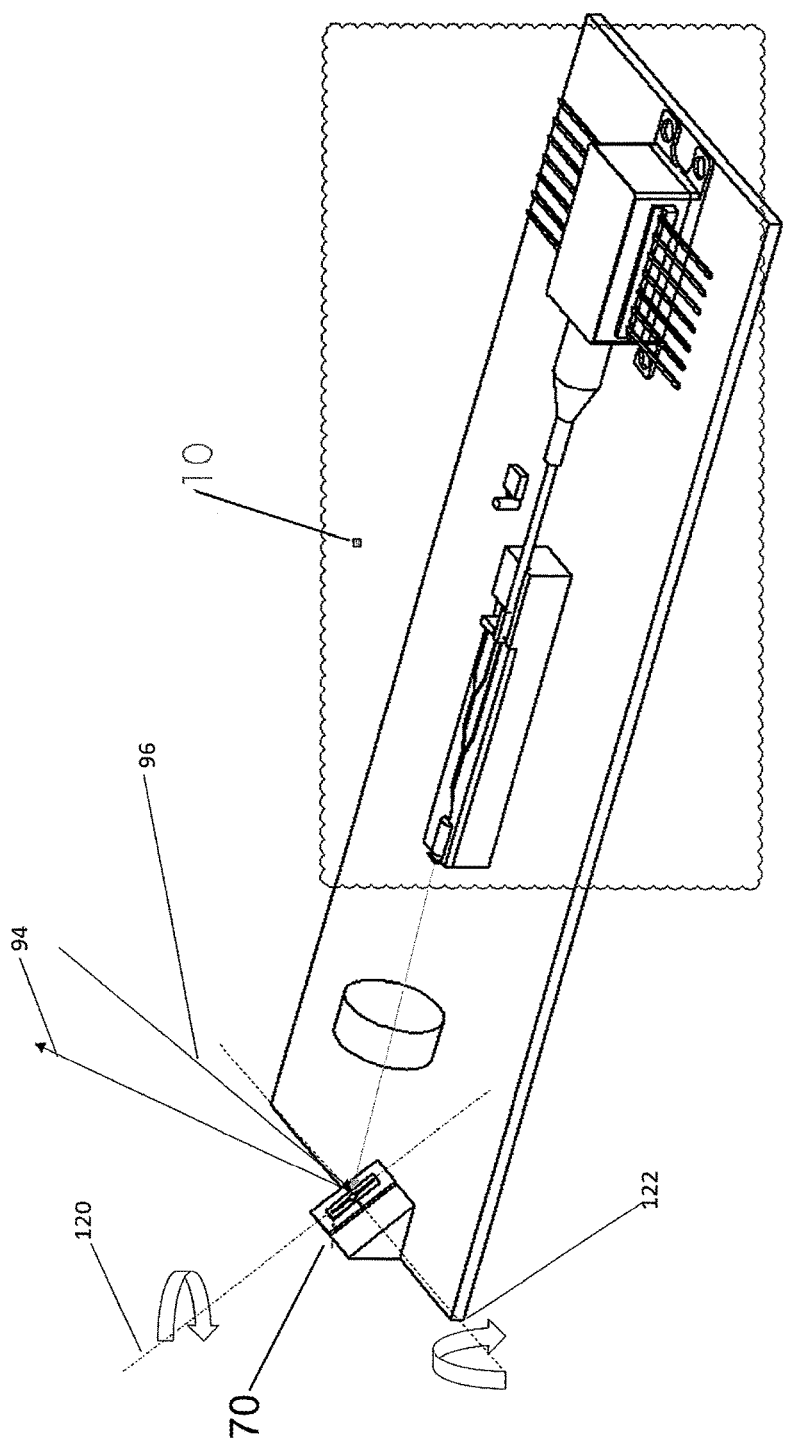
FIG. 7A schematically shows a 3D scanning and mapping system comprising the distance measuring pixel optomechanically coupled to a composite scanning MEMS mirror capable of scanning light along two mutually orthogonal axes.
Figure 7B:
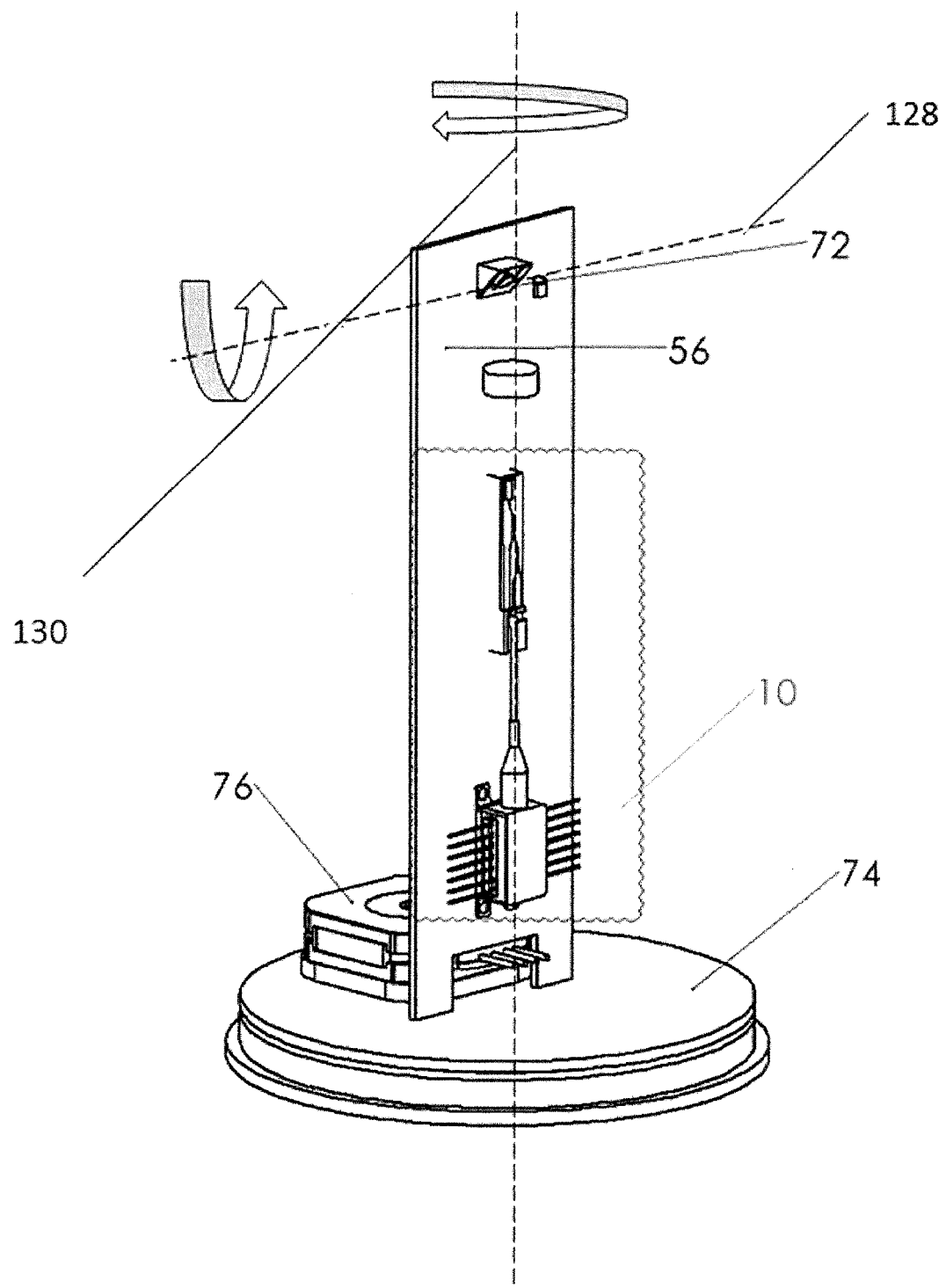
FIG. 7B schematically shows a similar system with a composite scanning MEMS mirror capable of scanning light along one axis, placed in a housing mechanically coupled to a motor capable of rotating the housing along a second orthogonal axis, according to exemplary embodiments of the invention.

The distance measuring pixel 10 forms an ultraminiature, range finding system that can accurately measure distance, but does not require expensive optics, electronic circuits, and optical alignment steps in fabrication as is the case for existing high precision FMCW and other laser ranging systems. Advantageously, a single distance measuring pixel may be coupled with a composite MEMS scanning mirror 70 to create a very inexpensive, wide field of view (>120°) 3D laser scanning and mapping system as shown in FIGS. 7A and 7B. The MEMS mirror may be capable of oscillating or rotating along two independent axes 120 and 122 and may be placed so that at least one rotation axis of the mirror 70 is at a 45° angle to the optical axis of the distance measuring pixel as shown in FIG. 7A. The arrangement described herein is meant only to illustrate a simple exemplary arrangement. It will be readily apparent to one skilled in the art that other optical arrangements may be used to couple light between the MEMS 70 and distance measuring pixel 10. The MEMS mirror 70 scans the chirped laser light 94 output from the distance measuring pixel over a target object, and redirects the reflected echo light 96 back towards the pixel. By raster scanning the laser beam along two mutually orthogonal axes, a 3D map of the object may be created.

Alternatively, a similarly inexpensive, high performance 3D scanning and mapping system may be created using the distance measuring pixel 10 of the present invention. It may be coupled to a MEMS mirror 72 capable of oscillating along a first axis 128 as shown in FIG. 7B. The distance measuring pixel 10 and MEMS mirror 72 may be co-located on a common rigid substrate 56, and placed within a housing 74 that is mechanically coupled to a miniature motor 76 capable of precisely rotating the distance measuring pixel and MEMS assembly along a second axis 130 that is orthogonal to the axis of rotation of the MEMS mirror. Such a system may be capable of scanning over a 360° field of view in at least one dimension.

Figure 8:
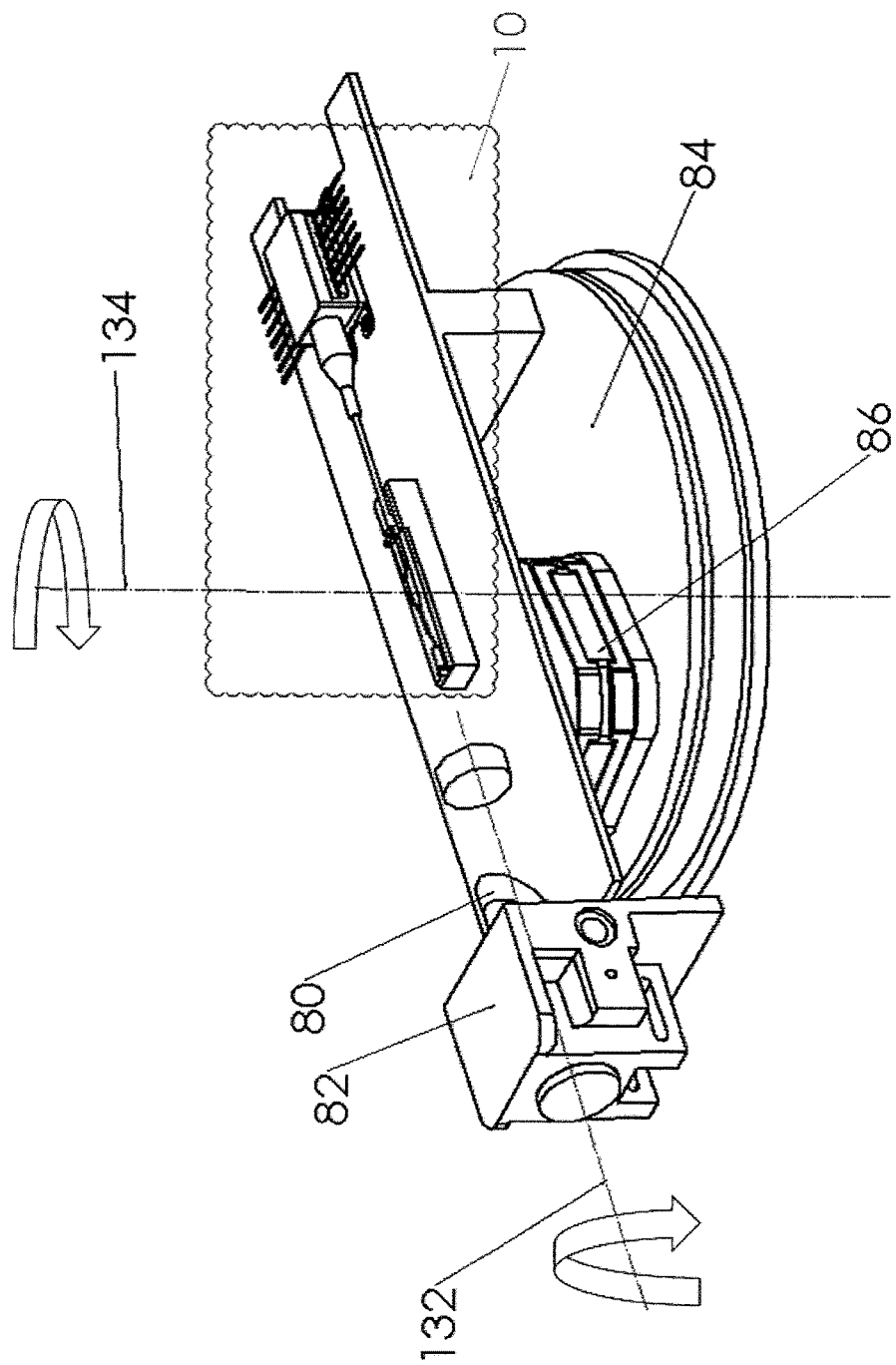
FIG. 8 schematically shows a 3D scanning and mapping system comprised of the distance measuring pixel optomechanically coupled to a mirror that is mechanically coupled to a motor capable of rotating along one axis, and placed within a housing that is mechanically coupled to a second motor capable of rotating along a second mutually orthogonal axis, according to an exemplary embodiment of the invention.

FIG. 8 shows another embodiment of a 3D scanning and mapping system using distance measuring pixel 10. In this arrangement, chirped laser light emitted from the distance measuring pixel 10 is scanned along a first axis 132 using a mirror 80 mechanically coupled to a miniature motor 82. Mirror 80 may have an elliptically shaped face and is mechanically coupled to motor 82 such that the elliptical face is at 45° to the axis of rotation of motor 82. The mirror and motor assembly are arranged relative to the distance measuring pixel such that the optical axis of the distance measuring pixel and focusing optics is collinear with the axis of rotation of motor 82. Distance measuring pixel 10, mirror 80 and motor 82 may be placed within housing 84 that is mechanically coupled to a second motor 86 capable of rotating along a second axis 134 that may be orthogonal to the rotation axis of motor 82, to create a 3D scanning and mapping system with a field of view of 360° in at least one dimension.

The systems described in FIGS. 7A-7B and FIG. 8 have a total volume <600 cm$^3$, which is substantially less than that of existing laser scanning systems. The size of the mirror aperture may depend on the desired range at which the system is designed to perform distance measurements. Measurements over longer distance ranges require greater light collection capability and hence larger mirror apertures. Diameters of 1-10 millimeters may be suitable mirror sizes for maximum ranges between 10 meters and 150 meters with a range resolution of ≤1 centimeter. The laser wavelength may advantageously be ≥1300 nm, with a CW output power of ≤100 mW.

The advantages of the disclosed distance measuring pixel 10 and 3D scanning and mapping systems arrangements based on distance measuring pixel compared with current state of the art 3D laser scanning and mapping systems are: (1) A factor of 10$^3$ reduction in volume, (2) A factor of 10 less expensive, (3) No critical optical alignment required, (4) Vibration resistance, (5) Greater immunity to back reflections and stray light from the environment. Furthermore, another salient feature of a distance measuring pixel/MEMS mirror 3D scanning and mapping system is the ability to program the MEMS to scan in optimized 2D patterns to first do a cursory scan of the overall target area, and then selectively focus on specific areas of the target for improved resolution and/or higher signal-to-noise ratio.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments, which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

We claim:
1. A distance-measuring pixel apparatus, comprising:
I.) a photonic integrated circuit disposed on a common substrate, comprising:
a photonic integrated circuit substrate having disposed thereon,
a first 3 dB directional coupler having first and second output ports and first and second input ports;
a second 3 dB directional coupler having first and second output ports and first and second input ports,
wherein the second input port of the first 3 dB directional coupler is directly optically coupled to the first input port of the second 3 dB directional coupler;
a GRIN lens having a first side that is optomechanically coupled to the first output port of the first 3 dB directional coupler;
a partially reflecting Faraday mirror having a first side that is optomechanically coupled to a second side of the GRIN lens and configured to reflect between 0.1%, to 50% of light emitted from the first output port of the first 3 dB directional coupler;
II.) a source laser having an output that is optically coupled to the first input port of the first 3 dB directional coupler;
III.) a first photodetector optomechanically coupled to the first output port of the second 3 dB directional coupler; and
IV.) a second photodetector optomechanically coupled to the second output port of the second 3 dB directional coupler.

2. The pixel apparatus of claim 1, wherein the second output port of the first directional coupler and the second input port of the second directional coupler are optically terminated.

3. The pixel apparatus of claim 1, wherein the source laser is a laser diode.

4. The pixel apparatus of claim 1, wherein the source laser output is linearly polarized.

5. The pixel apparatus of claim 1, wherein the source laser output is in the near infrared, mid infrared, or long wave infrared spectral regions.

6. The pixel apparatus of claim 1, wherein the source laser output is linearly chirped.

7. The pixel apparatus of claim 1, wherein the source laser is a distributed feedback (DFB) or distributed Bragg Reflector (DBR) laser with linewidths of ≤1 MHz.

8. The pixel apparatus of claim 1, wherein the source laser output is in a frequency modulated continuous wave format.

9. The pixel apparatus of claim 1, wherein the GRIN lens is in the form of a rod.

10. The pixel apparatus of claim 1, wherein the first and second photodetectors are electrically configured to perform autobalanced, differential signal detection.

11. The pixel apparatus of claim 1, further comprising an optical isolator disposed between the source laser and the photonic integrated circuit.

12. The pixel apparatus of claim 1, wherein the source laser and the photonic integrated circuit are disposed on a common substrate.

13. The pixel apparatus of claim 1, wherein the photodetectors are integrally fabricated within the photonic integrated circuit.

14. The pixel apparatus of claim 1, further comprising a light focusing component disposed optically downstream of the partial Faraday mirror.

15. The pixel apparatus of claim 14, further comprising:
a mirror;
a first motor mechanically coupled to the mirror and configured to provide a rotation about a first axis;
a housing in which the first motor is disposed; and
a second motor mechanically coupled to the housing and configured to provide a rotation about a second axis that is different than the first axis.

16. The pixel apparatus of claim 14, further comprising a composite scanning MEMS mirror capable of oscillating along one or more axes, disposed on the common substrate.

17. The pixel apparatus of claim 16, further comprising:
a housing on which the common substrate is disposed; and
a motor configured to provide a rotation about an axis, mechanically coupled to the housing.

18. A method of measuring distance between a distance measuring pixel and a remote object, comprising:
providing a distance measuring pixel apparatus as set forth in claim 1;
producing a frequency modulated light beam from the source laser;
coupling the frequency modulated light beam from the source laser into the first input port of the first 3 dB bidirectional coupler such that half the light is extinguished at the second output port of the first 3 dB bidirectional coupler, while the remainder is output at the first output port of the first 3 dB bidirectional coupler;
collecting a predetermined fraction of the light reflected from the partial Faraday mirror back into the GRIN lens and into the first output port of the first directional coupler to form a local oscillator (LO) light beam;
transmitting the remaining frequency modulated light beam through the partial Faraday mirror and towards a focusing optical component, which gradually focuses the light;
collecting light reflected from the remote object intersecting the gradually focused light using the focusing optical component, through the partial Faraday mirror, into the GRIN lens and subsequently into the first output port of the first bidirectional coupler, to form an echo light beam;
directing the combined LO and echo light beams towards the first input port of the second 3 dB bidirectional coupler where it is split equally at the two output ports of the second directional coupler;
delivering the combined LO and echo beams at each output port of the second directional coupler onto the surface of a photodetector, wherein the optical mixing of the LO and echo signals produces a modulation of the photocurrent of each photodetector at a frequency that encodes the distance of the echo.

* * * * *